Patented Mar. 18, 1930

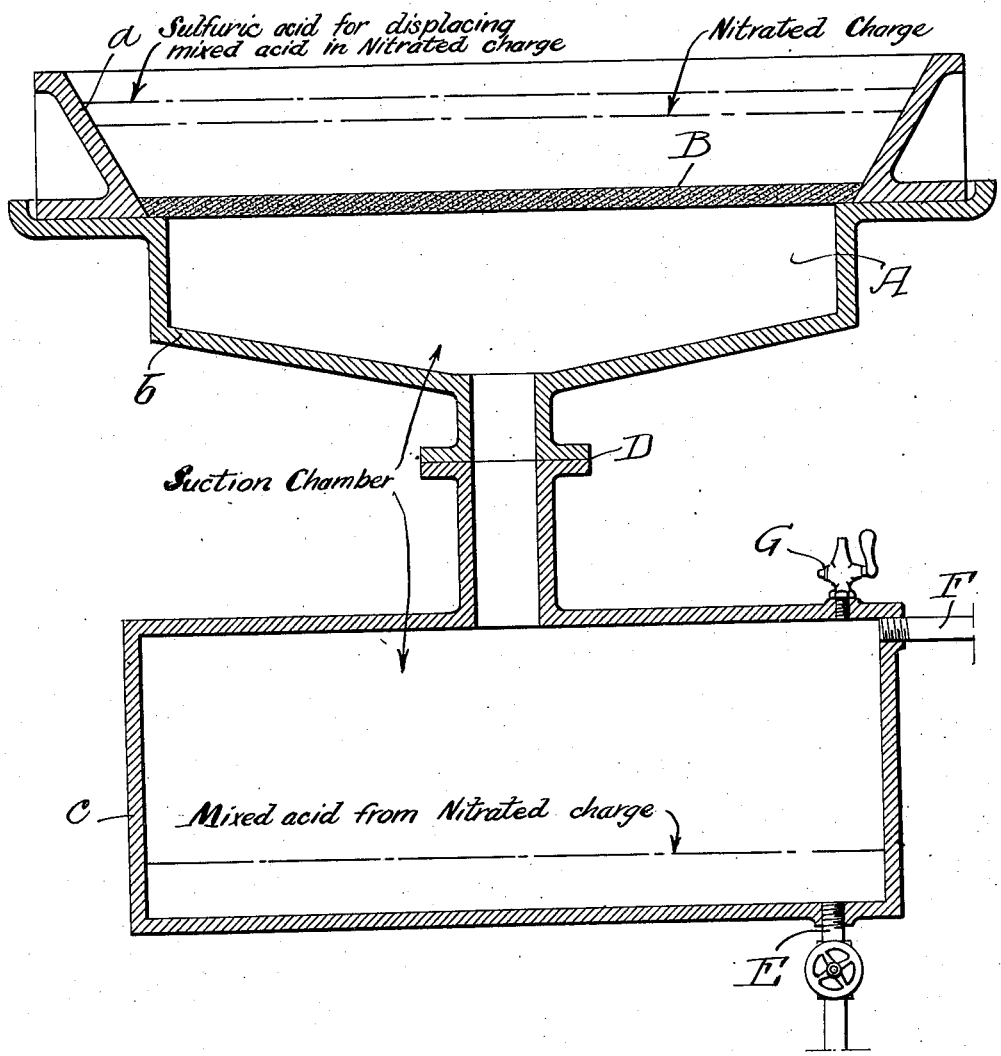

1,751,367

UNITED STATES PATENT OFFICE

JEAN V. SKOGLUND, OF NEW YORK, N. Y., ASSIGNOR TO TROJAN POWDER COMPANY, OF NEW YORK, N. Y., A CORPORATION OF NEW YORK

PROCESS OF TREATING NITRATED BODIES

Application filed October 8, 1921. Serial No. 506,445.

My invention relates to the treatment of nitrated bodies, more particularly nitrostarch having mixed therewith mixed acids employed in the nitration process, and its object is to provide a method for separating the said residual mixed acids from the nitrostarch.

In Letters Patent No. 1,311,017, issued in my name as assignor, July 22nd, 1919, I have described a method of separating nitrostarch from mixed acids by displacing the residual acid in successive stages by weaker acids. According to my present process it is not necessary to displace the original residual mixed acids with weaker acid, and after a single displacement step the displacing acid may be removed from the nitrated charge by drowning with water.

In carrying out the present process, any suitable form of apparatus may be employed, one which I have found suitable being shown in sectional elevation in the accompanying drawing, in which A is the displacing vessel, in this instance formed of two parts, $a$ and $b$, the part $a$ being of acid-resisting material, and the part $b$ being suitably lined with such material. B is a filter plate supported in vessel A. This plate may be a "Filtros" block, porous porcelain or any suitable material sufficiently permeable to the acid under working conditions but not sufficiently porous to permit the passage of the nitrostarch granules. C is the receiving vessel with suitable connection with the vessel A, as by a ground joint at D, said vessel C being provided with suitable discharge, as the valve controlled pipe E, and with suction tube F for connection with a suitable suction source not shown. Air may be admitted to the receiving vessel by means of cock G, at such point as the proper carrying out of the process may require.

My present process, in its preferred form, is as follows:

The nitrated charge is placed upon a filtering surface, in a layer approximately 4½ inches thick, and by suction or pressure the excess acid present in the nitrated charge is caused to pass through the porous plate. In practice I prefer to use 50 sq. cm. of filtering surface for each kilogram of nitrated charge which I treat, this giving a layer of nitrated charge approximately 11.5 cm. in thickness. I then flow over the nitrated charge on the filter sulfuric acid of approximately the same specific gravity as that of the mixed acid present in the nitrated charge, and by suction or pressure, cause the displacement of said mixed acid by the sulfuric acid; preferably using only sufficient of the sulfuric acid as may be required for complete displacement.

The nitrostarch saturated with the displacing sulfuric acid is now removed from the filter bed and "drowned" in water, giving nitrostarch and a dilute mixture of sulfuric acid and nitric acid, which nitric acid is apparently in weak combination with the nitrostarch previous to displacement. The dilute acid can be then concentrated, the amount of nitric acid present being driven off during the concentration. By displacing the mixed acids before the "drowning" operation by means of sulfuric acid, I obtain an increased recovery of nitric acid in the form of strong mixed acid, through avoiding the passing of all of my nitric acid into difficultly recoverable form as dilute mixed acid.

The recovery and subsequent utilization of the waste mixed acid originally contained with the nitrated charge is an item of importance.

The waste acid from nitrostarch manufacture may contain from 10% to 20% of nitric acid, from 10% to 20% of water and from 60% to 80% of sulfuric acid, the exact composition of the waste acid depending upon the composition of the mixed acid used in nitrating. Although the nitric acid in waste acid is present in much smaller amount than the sulfuric acid, the actual value of the nitric acid is considerably in excess of the value of the sulfuric acid. One purpose of my present invention is to separate the waste acid from the nitrostarch, under conditions which are particularly satisfactory for the recovery of the nitric acid content by the customary denitration operations.

In order that the nitric acid content of waste mixed acid should be economically recoverable by commercial processes it is desirable that not over 30% of water should be present. Where a strong acid is displaced by one materially weaker, some dilution of the displaced acid may necessarily take place, and accordingly, as a displacing acid I prefer to employ sulfuric acid of such concentration as will eliminate any tendency to cause material increase in the water content of the displaced mixed acids. For example, if the mixed acid in the nitrated charge is 60° Bé. I may displace by sulfuric acid of from 56° Bé. to 62° Bé.

The strong waste mixed acid after displacement is submitted to the customary denitration operation for the recovery of the nitric acid content, which operation can, as stated, be carried out under the most advantageous conditions by reason of the fact that practically no dilution has accompanied the displacement step.

The process hereinabove described is capable of modification.

For example, after displacing the mixed acid with strong sulfuric acid, I may then displace the sulfuric acid with water instead or "drowning". One way to accomplish this is to first run the displacing sulfuric acid over the nitrated charge in such a way as to avoid mixing with or disturbing the surface of the nitrated charge, so as to form an even layer of sulfuric acid over the charge, and over this layer of sulfuric acid to run a layer of water, again avoiding mixing. By then applying suction or pressure the sulfuric acid is caused to displace the mixed acids, and in turn to be displaced by the water. By employing just enough sulfuric acid as is required to displace the mixed acid present in the nitrated charge, and an amount of water just sufficient to displace the sulfuric acid from the nitrated charge, and by stopping the application of suction or pressure as soon as the sulfuric acid has passed into the filtering surface and the water into the nitrostarch layer, I can remove the valuable waste mixed acid which is now in the receiving vessel, and which has not been materially diluted, and I can remove the nitrostarch from which both the waste mixed acid and the sulfuric acid have been successively displaced, for one or two suitable washing treatments. In carrying out this modified process I have successfully used as the filter surface commercial "Filtros" blocks 1¼ inches thick, a nitrated charge, before applying suction, 4¼ inches thick, a layer of sulfuric acid, before application of suction, approximately 1 inch thick, and a layer of water, before suction approximately 1 inch thick. Suction can be employed equivalent to a 20 inch column of mercury, or two-thirds of an atmosphere, the suction being left on for about three hours. The nitrated charge, the displacing sulfuric acid and the water, are preferably all cooled before being used, the nitrated charge to about 2° C., the sulfuric acid to about −5° C., and the displacing water to about 0° C. In addition if desired a hollow aluminum cover can be placed over the displacement chamber and refrigerated air be passed through this cover. At the conclusion of the displacing operation, the sulfuric acid (containing some nitric acid) will remain in the filter block, to be displaced therefrom in the succeeding displacing operation.

Instead of using a layer of water just sufficient to displace the sulfuric acid, I may use an excess of water, stopping the operation as soon as the water begins to pass into the receiving vessel or at that point diverting the flow of water by any suitable means, so that it will not pass into the receiving vessel and become mixed with the contents of that vessel.

It will also be understood that if desired, the first step of displacing by strong sulfuric acid, may be followed by a series of displacements in successive stages by weaker acids according to the procedure of my Patent No. 1,311,017 hereinbefore mentioned.

I claim:

1. The process of treating nitrated bodies to free the same from mixed acid, which consists in displacing substantially all of the free mixed acid by a mineral acid of substantially the same specific gravity recoverable in concentrated form after dilution by evaporation of the water content, and thereafter drowning the mass with water.

2. The process of treating nitrated bodies to free the same from mixed acid, which comprises displacing substantially all of the mixed acid by sulfuric acid of substantially the same specific gravity and thereafter drowning the mass with water.

JEAN V. SKOGLUND.